(12) United States Patent
Gschwind et al.

(10) Patent No.: US 7,847,221 B2
(45) Date of Patent: Dec. 7, 2010

(54) HEATING FLANGE WITH GEOMETRICALLY STABLE STRUCTURE

(75) Inventors: Thomas Gschwind, Bad Dürkheim (DE); Mathias Proner, Karlsruhe (DE)

(73) Assignee: DBK David + Baader GmbH, Kandel/Pfalz (DE)

( * ) Notice: Subject to any disclaimer, the term of this patent is extended or adjusted under 35 U.S.C. 154(b) by 1346 days.

(21) Appl. No.: 11/326,591

(22) Filed: Jan. 5, 2006

(65) Prior Publication Data
US 2006/0153546 A1 Jul. 13, 2006

(30) Foreign Application Priority Data
Jan. 7, 2005 (EP) .................. 05000258

(51) Int. Cl.
H05B 3/06 (2006.01)
F24D 13/00 (2006.01)

(52) U.S. Cl. .............. 219/542; 219/206; 219/536; 219/537; 219/523; 219/532; 219/520; 123/549; 392/347; 392/371; 392/379; 392/485

(58) Field of Classification Search ............ 219/206, 219/536–7, 523, 532, 520, 542; 123/549; 392/550, 371, 379, 485, 347
See application file for complete search history.

(56) References Cited

U.S. PATENT DOCUMENTS

| | | | |
|---|---|---|---|
| 4,463,721 A | | 8/1984 | Hayashi et al. |
| 6,040,557 A | * | 3/2000 | Prust et al. .......... 219/206 |
| 6,964,269 B2 | | 11/2005 | Gschwind et al. |

FOREIGN PATENT DOCUMENTS

| | | |
|---|---|---|
| DE | 19515533 | 11/1996 |
| DE | 10214166 | 10/2003 |
| DE | 10257921 | 4/2004 |
| JP | 60075753 | 4/1985 |
| WO | WO 99/53187 | 10/1999 |
| WO | WO 00/34643 | 6/2000 |

* cited by examiner

*Primary Examiner*—Shawntina Fuqua
(74) *Attorney, Agent, or Firm*—Michael Best & Friedrich LLP

(57) ABSTRACT

Heating flange (1) for heating a flow of gas as it flows though a cross-section of flow (S), wherein the heating flange (1) is designed such that it can be inserted or interposed in an intake line (A) of an internal combustion engine and has at least one heat conductor (5) that extends through the cross-section of flow (S) from a mounting point (6a) to an immediately following further mounting point (6b) on the heating flange (1), as well as a retaining leg piece (2), which is provided with at least one of the mounting points (6a). In order to create an improved heating flange of a simple and robust construction that is easier to manufacture, mount and maintain, according to the invention, it is provided for the longitudinal axis of the one retaining leg piece (2) to form a triangle, on the one hand, with two heating leg pieces (5a, 5b) of the heat conductor (5) between the one mounting point (6a) and the other mounting point (6b), which is likewise arranged on the one retaining leg piece (2), or, on the other hand, with the longitudinal axis of a further retaining leg piece (3), on which the further mounting point (6b) is provided, as well as with the straight line through the one (6a) and the other mounting point (6b).

60 Claims, 8 Drawing Sheets

HEATING FLANGE WITH GEOMETRICALLY STABLE STRUCTURE

FIELD OF THE INVENTION

The invention under consideration relates to a heating flange for heating a flow of gas that flows through a cross-section of flow, wherein the heating flange is designed so that it can be inserted or interposed in an intake line of an internal combustion engine and so that it has at least one heat conductor, which extends through the cross-section of flow from one mounting point to an immediately following further mounting point on the heating flange, as well as a retaining leg piece, which is provided with at least one of the mounting points.

BACKGROUND OF THE INVENTION

Heating flanges of the generic kind are principally used for heating the flow of intake air in an intake line leading to an internal combustion engine. They are especially used in diesel engines in order to make a cold start easier.

In DE 105 15 533 C2, a heating flange is described in which a heat conductor running in a meandering shape is mounted on a carrier rod. The heat conductor is, however, only mounted on the carrier rod in the middle of the straight meandering turns, but not on the reversements of the meandering. As a result, it can be that, given the strong vibrations to which a heating flange is exposed in an intake line leading to an internal combustion engine, contacts of adjacent heat conductor reversements result, leading to a short circuit.

This problem is remedied in WO 99/53187 A1 by having the reversements of the heating meander placed in two holding devices. The two holders are connected to one another and arranged opposite one another, so that the straight sections of the heating meander run parallel between the two holders.

In WO 00/34643 A1, a further development of WO 99/53187 A1 is described in which the holding devices arranged in parallel are attached to two opposite walls of a closed frame of the heating flange.

However, the problem that occurs with both WO 99/53187 A1 and WO 00/34643 A1 is that the heat conductor cannot be fixedly mounted to the holders or the frame because the heat conductor and the frame expand to different degrees during the operation of the heating flange. For this reason, the holders of the heat conductors are principally mounted to the frame via a spring element, which compensates for the various linear expansions, such as is described in WO 99/53187 A1, WO 00/34643 A1 or also DE 102 57 921 B3, for example.

A fixed connection of the heat conductor to the frame with simultaneous cushioning bearing of the heat conductor for balancing the different linear expansions is achieved in the apparatus of DE 102 14 166 A1 by an angled form of the meander coil leg pieces. The heating flange of DE 102 14 166 A1 comprises a closed basic body with a retaining clamp and, fixedly connected to the closed basic body, a heating element that is arranged as a meander coil.

SUMMARY OF THE INVENTION

With the known heating flanges, however, the manufacture, mounting and maintenance are problematic.

The object of the invention under consideration therefore is to create an improved heating flange of a simple and robust construction that is easier to manufacture, mount and maintain.

This object is solved for a heating flange of the type mentioned at the beginning in that the longitudinal axis of the one retaining leg piece forms a triangle, on the one hand with two heating leg pieces of the heat conductor between the one mounting point and the further mounting point that is likewise arranged on the one retaining leg piece, or, on the other hand, with the longitudinal axis of a further retaining leg piece on which the further mounting point is provided as well as the straight line through the one and the other mounting points.

Furthermore, this object is solved by means of the fact that the heat conductor extends through the cross-section of flow in a curved form from the one mounting point, arranged on the edge of the cross-section of flow, essentially freely to the further mounting point, likewise arranged on the edge of the cross-section of flow and on the one retaining side piece.

In this context, curved means not only a curve consisting of one or more segments of a circle, but also an open polygon, which extends through the cross-section of flow between the mounting points in a curved form with straight segments and that, with the retaining leg piece, forms a trapezoid or rectangle, for example. Naturally, the curved form can also represent a combination of circular and straight segments.

Using this surprisingly simple design measure, it is possible to achieve a particularly simple and simultaneously robust construction of a heating flange. The statically stable triangular or curved structure lends the heating flange particularly good strength, so that the heating flange according to the invention can easily be exposed to the strong vibrations in an intake line. Unlike WO 99/53187 A1 and WO 00/34643 A1, the heat conductor according to the invention does not have to be cushion-mounted between two opposing retaining leg pieces, but can instead be fixedly connected to the retaining leg pieces, because the triangular or curved structure also supports compensation of the linear expansion. Moreover, with this arrangement, the connection points of the heating element to the frame are more easily accessible for mounting and maintenance purposes than is the case with the above-mentioned heating flanges known from the state of the art. A closed frame design is no longer compellingly necessary with the solution according to the invention, because the stable geometric structure offers sufficient strength and stiffness.

The heating flange improved in such a way can be further enhanced by various, mutually independent embodiments, each one advantageous in itself. At the same time, the individual embodiments can be combined in a mutually independent manner. These embodiments and the advantages connected with each of these embodiments will be briefly discussed in the following.

The heating device of the heating flange according to the invention comprises at least one heat conductor, which, with the heating flange inserted, extends through the cross-section of flow, which is restricted or spanned by the retaining leg pieces and through which the flow of gas flows, with said heat conductor being exposed to the flow of intake air. For example, the heat conductor can be an electric resistance wire, a heater rod or a strip heater.

According to a first embodiment, it is possible that at least one additional heat conductor extends through the cross-section of flow. The use of multiple heat conductors within the cross-section of flow of the heating flange allows, on the one hand, a larger quantity of heat to be transferred from the heat conductor to the air flowing by. On the other hand, essentially more precise control of the heat transfer is possible, for example, by connecting or disconnecting a heat conductor as needed.

According to a further embodiment, the heat conductor can be formed as a heating meander with multiple heat conductor sections arranged between two mounting points, and can extend through the cross-section of flow repeatedly in a meandering form. A heat conductor with several heat conductor sections improves the heat transfer from the heating flange to the flowing air, as does the development with several separate heating elements. As an additional advantage, however, when there is a heating meander, the number of necessary electrical connection points is reduced, which leads to lower material consumption and simplified mounting.

In order to accommodate longer heat conductors with a large surface in the cross-section of flow of the heating flange, the heat conductor can have at least two straight heating leg pieces that form at least one angle. According to the invention, embodiments in which one heat conductor is angled at several kinks are also possible. In this case, embodiments from roughly linear to approximately curved are conceivable, with which a longer heat conductor can be mounted between two mounting points. In this way, the heat transfer is improved without it being necessary to change the compact design of the heating flange.

In a particularly advantageous development, the angle of the heat conductor can be substantially a right angle. In this form, the heat conductor forms an essentially L-shaped cross-section in the cross-section of flow. This creates a heating flange with a compact heat conductor, which has a very large surface for effective heat transfer.

According to a further advantageous development, the at least one heat conductor can be formed as an electric, essentially ribbon-shaped heat conductor. In this way, the heat conductor has a large surface that the intake air can flow around, and allows a particularly good heat transfer between the heat conductor and the intake air to be heated. Principally, the flat-edged sides of the strip heater point in the direction of the flow of the intake air, in order to oppose the intake air with a flow resistance that is as low as possible. It is also possible, however, to mount the strip heater inclined to the direction of the flow of the intake air. This results in a swirling of the intake air, and one achieves a better mixing of the heated intake air.

In order to accommodate an effective heating surface in the cross-section of flow of the heating flange where the heating surface is as large as possible while also avoiding contact among the various heat conductors or heat conductor sections during operation, it is advantageous if the heat conductor sections of one heat conductor and/or various heat conductors are arranged in the cross-section of flow so that they are essentially parallel. Consequently, a defined and constant distance is always guaranteed between the current-carrying heating elements, as a result of which the risk of short circuits caused by contact between adjacent heat conductors is reduced.

According to a further embodiment, a particularly large heating surface can be created by the heat conductor sections of a heat conductor and/or various heat conductors having various lengths and being arranged in the cross-section of flow nested in one another. Furthermore, if various heat conductors of various lengths are used, the advantage that arises is that the heating capacity of the heating flange can be varied. Using selective activation of separate heat conductors, one is able to selectively change the length of the heating heat conductors, and consequently the effective heating surface of the heating flange.

Heating flanges of the type mentioned at the beginning known from the state of the art, as, for example, in WO 99/53187 A1 or WO 00/34643 A1, have spring elements between the heat conductors and the retaining leg pieces, which compensate the linear expansion of the heat conductor as it is heated. However, the use of springs involves additional components and complex mounting, on the one hand, as well as lower stability of the connection between the heat conductor and frame, on the other. According to an advantageous embodiment, the heat conductor can have a heat-deformation section that extends essentially freely in the cross-section of flow between the mounting points, where the ductility of this heat-deformation section when the heat conductor is heated is larger than the ductility of its surroundings. Consequently, no cushioning elements for compensation of the thermal expansion of the heat conductor are necessary, because the linear expansion takes place selectively at the deformation sections as a result of the shape of the heat conductor.

In principle, one can either increase the ductility of the heat conductor in the heat-deformation sections in comparison to its surroundings or reduce the ductility of the surroundings in comparison to the deformation sections, so that the linear expansion of the heat conductor preferably occurs in the heat-deformation sections.

In the first case, the heat-deformation section can have a smaller cross-section than that of its surroundings. A reduced cross-section means lower strength or stiffness, as a result of which the tensions that arise during the thermal heating are preferably relieved in the less stable sections.

A further possibility for increasing the ductility in the heat-deformation section is for the longitudinal axis of the heat conductor to have a change of direction in the heat-deformation section. Through the change of direction, such as, for example, a curvature or a kink, of the heat conductor, the tensions that essentially occur lengthwise act on the heat conductor not only axially along the lengthwise direction, but also with a radial component, which leads to additional bending stresses.

A further problem with heat flanges, however, is that non-fixed, adjacent sections of various heat conductors or of one heating meander come into contact when there are strong vibrations, leading to a short circuit.

To avoid short circuits, the heat conductor can be angled at least once at a kink between the mounting points, according to a further advantageous embodiment. Here a kink does not only mean an abrupt bend of the heat conductor with a point of discontinuity, as occurs at the vertex of an angle, for example. Rather, the kink can also have a continuously implemented, curved transition in the size range of the material thickness, with a small radius.

At the heat conductor kink, first, its thermal linear expansion takes place in a defined direction, where this expansion occurs as a result of the high temperatures of the heat conductor when the heating flange is operated. Second, however, the heat conductor is also stiffened by the kink, which preferably lies in an area exposed to the intake air, because a kink divides a long, straight heat conductor section into two shorter and more stable straight areas.

In a further advantageous embodiment, the kinks of the heat conductor sections of one heat conductor and/or various heat conductors running through the cross-section of flow can essentially lie on a line. This line can, for example, essentially emanate from a point that lies roughly in the middle of a retaining leg piece or near the intersection of the longitudinal axes of two retaining leg pieces, and run from this starting point in the direction of the heat conductor kinks. In particular, the line can represent the perpendicular bisector of a leg piece or the bisecting line of the angle that is formed by the longitudinal axes of two retaining leg pieces and/or of two heating leg pieces at the kinks.

The second possibility for forming the ductility of the heat deformation areas so that it is larger than the ductility of the surroundings is to stiffen or stabilise the surroundings.

For increased vibrational stability of the heat conductors that extend into the cross-section of flow, the heat conductor can have stabilization areas, which, at least in part, are provided with stiffening profiles, by means of which the flexural rigidity is increased along the lengthwise direction of the heat conductor. The profiles, for example, H-, L-, T-, U-, Z-, Ω-or curved cross-sections in a plane perpendicular to the longitudinal axis of the heating leg piece, lead to stiffening of the heat conductors. In this way, movements of the heat conductors can be restricted and it is possible to avoid contacts among adjacent heat conductors and short circuits in the heating device.

A preferred embodiment provides that an essentially ribbon-shaped heat conductor can have at least one bead extending lengthwise along the heat conductor. The beads can likewise be shaped with various cross-section shapes, for example, an angular, curved, S-shaped, box-shaped or trapezoidal cross-section. Beads are simple to produce and facilitate stiffening of the heat conductor. Furthermore, a bead results in an enlarged surface of the heat conductor, and the intake air is swirled and mixed at the bead, as a result of which the heat transfer from the heat conductor to the intake air is likewise improved. The development of the heat conductor or the heating leg pieces stiffened in the longitudinal direction furthermore leads to the resulting stresses of the thermal expansion in the case of a development with kinks being more exactly relieved in a defined direction, because the beads or stiffening profiles prevent the straight sections from bending.

Because an embodiment with heat-deformation sections of the heat conductor can compensate for the linear expansion during heating because of the special heat conductor shape, it is therefore possible to leave out cushioning elements between the heat conductor and the retaining leg pieces. Therefore, the heat conductor can be essentially rigidly fixed to the respective retaining leg piece at the mounting points, which increases the stability of the heating flange.

A particularly advantageous embodiment results if one combines the advantages of the rigid and unmovable mounting of the heat conductor to the retaining leg pieces with the selective linear expansion in the heat deformation area.

For example, such an embodiment can be a heating meander, which is, first, rigidly mounted to each of the mounting points on the respective retaining leg piece. Second, the heat conductor could have at least one kink in each of its sections between two mounting points, preferably exactly one, substantially right-angled kink. Ultimately, one can additionally stiffen the sections of the heat conductor between one mounting point and the kink with beads or other profiles. In this way, it is possible to provide a compact and robust heating flange with an especially long heating meander. At the same time, the heating meander is fixedly mounted to the leg pieces, on the one hand, and is capable of selective linear expansion at the kinks, on the other hand. According to the invention, the kinks are applied in such a way that the linear expansion of the heating meander runs in a defined direction, namely along the line through the kinks, as a result of which contacts between adjacent sections of the heating meander, and therefore short circuits, are avoided.

Further embodiments allow a particularly advantageous manufacture and mounting of the heating flange according to the invention. In a further embodiment, the heat conductor is not connected directly to the leg pieces, but instead, an insulator body can be provided on each mounting point of a retaining leg piece between the heat conductor and the respective retaining leg piece, where said insulator body can function as a mounting body by means of which the heat conductor is attached to the respective leg piece. It is possible to mount the heat conductor easily to the frame of the heating flange via the insulator, which is fixedly connected to both the heat conductor and the mounting points of the leg pieces. For this purpose, the insulator body can be caulked at the frame, which is easy and saves material, from the manufacturing point of view.

For example, plastic, mica, ceramic or micanite can be used as the electrically insulating material, so that the leg piece can be shunted to a different potential than the heat conductor, for example, to earth. Furthermore, this embodiment requires less material, because the insulation is applied only to the points of direct contact between the leg piece and heat conductor.

Preferably, the insulator body is connected to the heat conductor via a means of attachment, for example, a screw with corresponding nut, a clip or a rivet. In this way, one achieves a particular secure connection between heat conductor and insulator, with a high level of strength.

If, for example, the heat conductor is a heating meander that is led back and forth between the mounting points of either one retaining leg piece or of several retaining leg pieces, then always an insulator body is connected to a turning point of the heating meander. Turning points are the attached areas of the heating meander at which the heat conductor is turned around after reaching the retaining leg piece and run back into the cross-section of flow again. At a turning point, the heating meander has a shape that is essentially U-shaped in the cross-section of flow, with, for example, a curved or planer base. A turning point with a planer base that has a short, flat section between two bends of roughly 90° proves to be particularly advantageous, because a large contact and bearing surface of the base of the turning point allows a secure connection with a high degree of strength for the insulator body.

In a further embodiment, the heat conductor, preferably a heating meander, and the insulator bodies connected to the heat conductor can be arranged as a one-piece, manageable unit. This embodiment is particularly advantageous from a manufacturing point of view. In a single bending and forming step, a flat, ribbon-shaped heat conductor can be formed into an angled heating meander with stiffenings by means of kinks and lengthwise beads. Subsequently, one attaches an insulator body to each turning point of the heating meander with a means of attachment, without there resulting any impairment in the accessibility to the mounting points due to the frame of the heating flange. The heat conductor and insulation plate unit pre-assembled in this way can be attached to the mounting points of the leg pieces, for example, stamped or clamped on, as a single production part.

Furthermore, it is also possible that the one-piece, manageable unit made of the heat conductor and insulator body can be repeatedly detached from the mounting points of the leg pieces. This embodiment is favourable with respect to the maintenance of the heat conductor, because, in case of a defect or modified requirements for the heating flange, a heat conductor can be repeatedly detached from the mounting points of the frame and, after a repair or replacement with another heat conductor, remounted to the frame again, for example, by screwing it on. This makes the heating flange simple to mount and especially easy to maintain.

According to a further embodiment, a recess can be formed at the mounting point in such a way that the insulator body is held in the recess, preferably in a form-fit. In this connection, the recess and the insulator body constitute an anti-twisting, open slide-bar, in which the insulator body can be plugged or inserted essentially linearly into the recess in an insertion direction that principally runs perpendicular to the cross-section of the flow. To ensure the linear movement, the recess and/or the insulator body has guide surfaces, with which the two parts touch each other. Consequently, the insulator body represents a full prism and the recess represents a correspondingly designed hollow prism that holds the full prism.

In the case of slide-bars, the expression prism indicates a body whose cross-section is the same everywhere and represents any chosen bounded figure. For example, such a cross-section can be rectangular, trapezoidal or triangular. In this way, the insulator is immobilised in the recess, with the exception of in the insertion direction. By means of this measure, which is simple from the design point of view, it is possible to attach the pre-assembled unit comprising the heat conductor with insulator bodies to the leg pieces after inclusion in the recess in a manner that is particularly simple from the manufacturing point of view, for example, by screwing, clamping or stamping the insulation plates.

If the dimensions of the recess are precisely matched to the outer dimensions of the insulator body, it is possible to hold the insulator in the recess of the mounting point in an insertion direction that runs essentially perpendicular to the cross-section of flow with a non-positive hold and in the two directions in space that are perpendicular to the insertion direction with a interlocking or form-fit hold.

In a further advantageous development, the insulator can be formed as an insulation plate. The recesses of the mounting points at the leg pieces of the frame form a preferably T-shaped groove that is matched to the insulation plate. Such a groove represents an insertion slot into which the insulation plate can be inserted as a slot nut. A plate has a large contact surface, both with the flat section of the turning point of the heating meander and also with the insertion slot, so that the result is a very solid connection. In this way, all parts of the heating flange can be fixedly connected together, without degrees of freedom.

According to a further advantageous embodiment, two retaining leg pieces can form an open frame in the form of an angle. Because of the open construction, the mounting points are very easily accessible, as a result of which the mounting of the heating flange is considerably facilitated. The angular shape of the frame spans a cross-section of flow, wherein the material-saving angular form furthermore makes more economical manufacture possible. The cross-section of flow is the surface of the heating flange that is spanned by the longitudinal axes of the two leg pieces and through which the intake air flows. Ultimately, by means of the free selection of the angular dimension from roughly 45° to 135°, preferably around 90°, the frame can be adopted to the geometric properties of the installation point of the heating flange or the cross-section of the intake line. This angular embodiment as a heating angle effects a simple but compact and robust design.

In a further embodiment, it is possible to arrange the longitudinal axes of the retaining leg pieces essentially perpendicular to one another. At the same time, the leg pieces can be directly connected to one another and form an essentially L-shaped or T-shaped frame in a cross-section in a plane parallel to the cross-section of flow. But embodiments are also possible in which the leg pieces with the mounting points are not directly connected to one another, but instead border on a connecting element, for example, a third leg piece of the frame, and are arranged at right-angles to one another via the connecting element. In the roughly right-angle arrangement, the leg pieces of a defined length span with the largest possible cross-section of flow, so that with a small installation size of the heating flange, large cross-sections of flow can be heated.

An especially advantageous embodiment can be achieved by having the leg pieces that are arranged essentially perpendicular to one another connected together at their ends, so that the retaining leg pieces form in cross-section an essentially L-shaped frame in a plane parallel to the cross-section of flow. In this way, good accessibility of the mounting points can be achieved with a material-saving, particularly stable and compact design of the heating angle, with a large cross-section of the flow.

According to a further embodiment, at least three retaining leg pieces of the heat conductor can form an essentially closed frame. In this way, the frame can protrude into the cross-section of flow as any desired polygon. The closed, circumferential frame form facilitates additional stability of the heating flange, as well as the attachment of a larger number of heat conductors and/or of longer heat conductors, because additional heating leg pieces are available.

According to a further embodiment, a retaining leg piece of the frame can be formed in one-piece with a mounting flange for particularly simple insertion and mounting of the heating flange into the intake line. The heating flange with the heating device can be attached in the intake line via the mounting flange. The attachment can be made with a screwed, clipped, welded or clamped connection, for example.

The mounting flange does not only facilitate the attachment of the heating flange according to the invention into a gas line, such as the intake line of an internal combustion engine. The mounting flange additionally facilitates a simple sealing of the mounting point of the heating flange. For this purpose, a sealing means can be arranged between the mounting flange and the intake line when the heating flange is in the mounted state. For example, a gasket or an O-ring can be used as a sealing means, where said sealing means lies on a shoulder of the mounting flange or is inserted into a circumferential groove of the shoulder. In this way, the sealing means, when the heating flange is in the mounted state, lies between the mounting leg piece and the outer wall of the gas line. In this way, when the heating flange is mounted, the mounting opening of the gas line is simultaneously sealed.

Very simple, economical and quick manufacture of the frame of the heating flange, particularly with the recesses at the leg pieces and the mounting flange attached in one-piece, is possible by manufacturing it as a cast part, preferably as an aluminium pressure-cast part. Alternatively, the manufacture can also be done as an extruded profile with subsequent mechanical finishing.

In the following, the configuration and function of the invention are explained by way of example using embodiments, with reference to the drawings. The various features of the individual embodiments can, independently of one another, be transferred from one embodiment to the other or left out, as was already shown above with the separate advantageous developments.

BRIEF DESCRIPTION OF THE DRAWINGS

Shown are.

DETAILED DESCRIPTION

Figure 1:
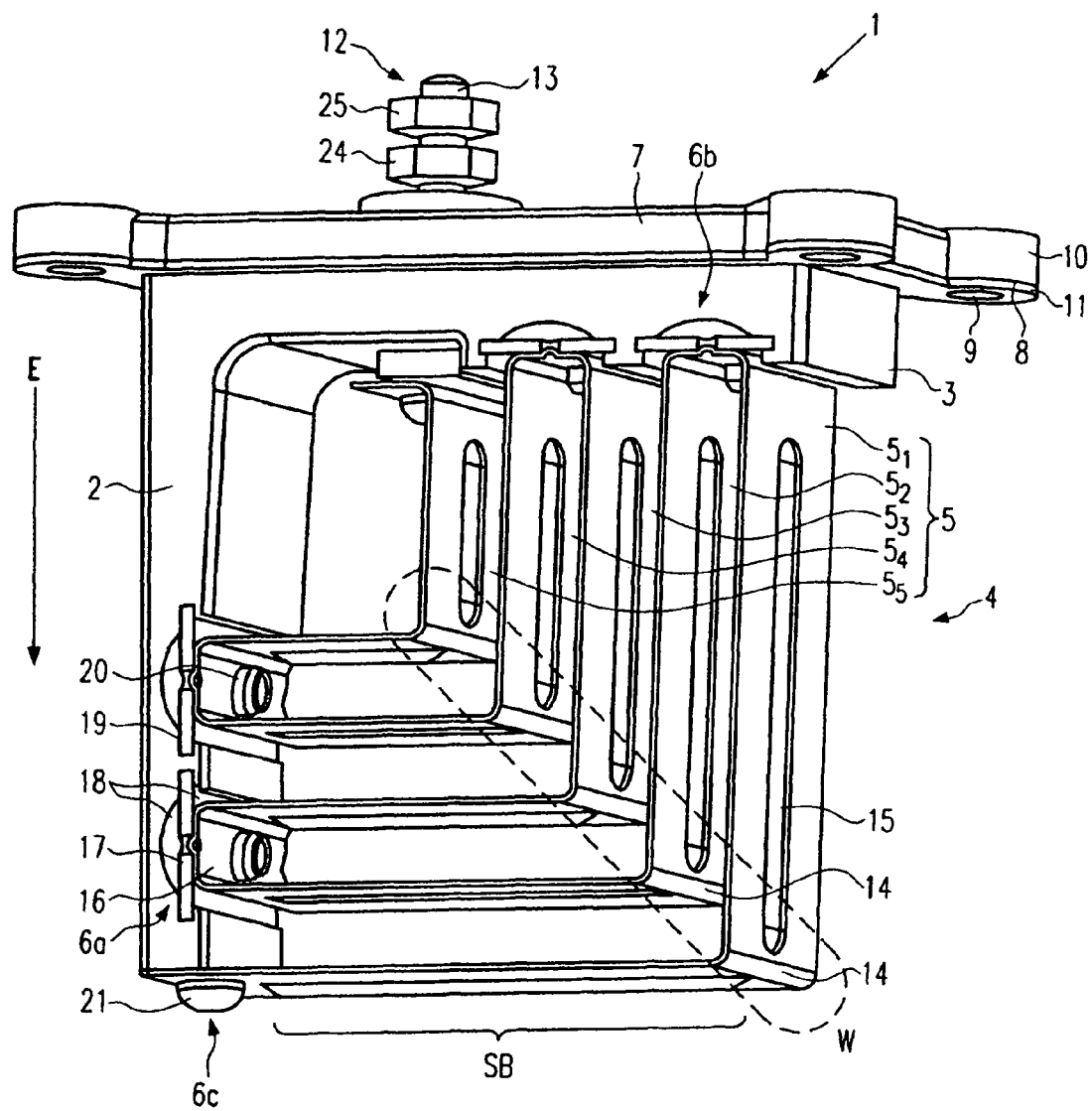
FIG. 1 a perspective depiction of an advantageous embodiment of the heating flange according to the invention.

FIG. 1 illustrates the configuration of the heating flange according to the invention in an embodiment that is used, for example, for heating the intake air of an internal combustion engine.

The heating flange 1 is provided with two flat leg pieces 2, 3, to which a heating device 4 with a heat conductor 5 is mounted. The heat conductor extends from a mounting point 6$a$ on the one side piece 2 to a further mounting point 6$b$ on the other side piece 3.

According to the embodiment as shown in FIG. 1, the two, roughly equally long leg pieces 2 and 3 form an open frame, which is designed as a right angle. In this embodiment, the two retaining leg pieces span the cross-section of flow of the heating flange, wherein the longitudinal axes of the leg pieces lie essentially perpendicular to each other. In this design of the frame, the cross-section of flow is the surface of the heating flange that is spanned by the two retaining leg pieces 2, 3 and through which the intake air flows.

The frame of the heating flange can be inserted, along an insertion direction E that runs parallel to the longitudinal axis of the leg piece 2 (in the following, insertion leg piece 2), into the intake line of an internal combustion engine (not shown in FIG. 1), for example, via an insertion slot that has a radial opening in the intake line. After insertion of the heating flange, the one insertion leg piece 2 extends parallel to the insertion direction of the heating flange. The other leg piece (in the following, mounting leg piece 3) lies parallel to the opening of the insertion slot of the intake air line. When the heating flange is in its inserted position, the two leg pieces 2 and 3 form a frame with an essentially L-shaped cross-section in the direction of flow. Hence the frame spans a roughly square cross-section of flow of the heating flange.

The mounting legpiece 3 is formed in one piece with a mounting flange 7, which extends levelly and parallel to leg piece 3. At the same time, the mounting flange 7 is mounted on that exterior side of the leg piece 3 that faces away from the cross-section of the flow, and, when the heating flange is in place, said mounting flange 7 lies outside the cross-section of the flow. The mounting flange 7 has a circumferential supporting shoulder 8, which, seen from the insertion direction E, protrudes over the leg piece 3 on all sides. On each of its four corner points that protrude laterally over the leg piece 3, the frame of the mounting flange 7 has a round mounting opening 9, which extends in the insertion direction E. The mounting opening 9 lies in installation point 10, which is formed as an eye concentrically around the mounting opening 9 and extending laterally over the corner points. Instead of this design, the mounting flange 7 can also be formed for another type of mounting, such as welding, clamping, clipping or riveting. Consequently, the heating flange 1 can be fixed in place to the intake line, for example, it can be screwed, via the mounting opening 9 of the installation point 10.

On the side of the supporting shoulder 8 that faces the heat conductor 5, a circumferential sealing means 11, for example, a gasket, is arranged. When the heating flange is in place, the sealing means lies between the outer wall of the intake air line and the supporting shoulder 8 of the mounting flange 7. Alternatively, as a sealing means, an O-ring seal can also be arranged in a circumferential groove of the supporting shoulder 8. After the heating flange 1 is inserted in the insertion slot, the heating flange 1 can be mounted in the installation points 10 in the intake line via the mounting openings 9, whereby the sealing means 11 provides a gas-proof seal for the heating flange with respect to the intake line.

The heating device 4 comprises a heat conductor 5 and an electric contact point 12 with a contact bolt 13. The contact bolt 13 extends in the insertion direction E of the heating flange, starting from the heat conductor 5 through the leg piece 3 to above the mounting flange 7. In the depicted embodiment, the contact point 12 is arranged in the mounting leg piece 3, close to the intersection of the longitudinal axes of the insertion leg piece 2 with the mounting leg piece 3. However, the contact point can also penetrate the mounting leg piece 3 at any other position. The heat conductor 5 can be connected to a voltage supply source via the contact point 12 and controlled using a control unit.

The heat conductor 5 in the embodiment depicted in FIG. 1 consists of a single, flat strip heater that is run as a meander strip heater with multiple heat conductor sections, ($S_1$, $S_2$, $S_3$, $S_4$, $S_5$) in a meandering way back and forth repeatedly between the mounting points 6$a$ and 6$b$ at the two leg pieces 2 and 3. At the same time, the flat edge sides of the meander strip heater point in the direction of flow of the intake air. The strip heater can, however, also be arranged so that it inclined with respect to the intake air. The heat conductor 5 has a kink 14 in each heat conductor section ($S_1$, $S_2$, $S_3$, $S_4$, $S_5$) that extends from a mounting point 6$a$ on the insertion leg piece 2 to another mounting point 6$b$ on the mounting leg piece 3. The kink 14 consequently divides a heat conductor section into two straight parts, the heat conductor leg pieces. At each kink 14, the strip heater is angled by roughly 90°, as a result of which it always meets the two leg pieces 2 and 3 perpendicularly. In the cross-section of flow, the heating flange 1 consequently has a cross-section of essentially parallel, nested squares of various side lengths. All of these squares have a common corner point, the location at which the two leg pieces 2 and 3 are connected together.

In each kink 14, there is a change in direction of the strip heater 5 by roughly 90° in a constant curve. Thus, the kinks 14 in FIG. 1 represent the heat deformation section W of the heat conductor 5. To stiffen the heat conductor 5, the meander strip heater has stabilisation areas SB with angular beads 15, in sections. In each heating leg piece of the meander strip heater, the beads 15 extend between a mounting point 6 and a kink 14. In the area of the kinks 14 and the sections that are mounted to the mounting points 6 of the leg pieces 2 and 3 as turning points 16, the meander strip heater is flat and not provided with stiffening beads.

At a turning point 16, the strip heater is turned by roughly 180°. The reversal is accomplished by double bending of the strip heater by about 90°, wherein there is a short, flat area between the two 90° angles.

The one end of the heat conductor 5 is connected to an end of the contact bolt 13 of the electric contact point 12 at a mounting point 6$b$ of the mounting leg piece 3. From this mounting point 6, the strip heater extends with a first heating leg piece perpendicular to the mounting leg piece 3 into the cross-section of the flow of heating flange, until it is turned by about 90° at a first kink 14 and run perpendicular to the insertion leg piece 2 as a second heating leg piece. After its first turning point 16 on the insertion leg piece 2, the meander strip heater is run back to the mounting leg piece 3 again. This heat conductor section runs from the connection point of the two leg pieces 2 and 3 parallel to and at a greater distance than the first section of the heat conductor 5 from the contact bolt 13 to the first turning point 16. Altogether, the heat conductor 5 shown in FIG. 1 has four turning points, two on each leg piece, 2 or 3, and five sections protruding into the through-flow surface of the heating flange, each with a kink 14, and a total of ten heating leg pieces. Ultimately, the meander strip heater ends in the mounting point 6c at the outer face side of the insertion leg piece 2 that extends in the insertion direction E.

The lengths of the straight sections of the heat conductor 5 increase successively in a meandering course from the contact bolt 13, so that the kinks 14 of the five sections lie on a line.

Figure 2:
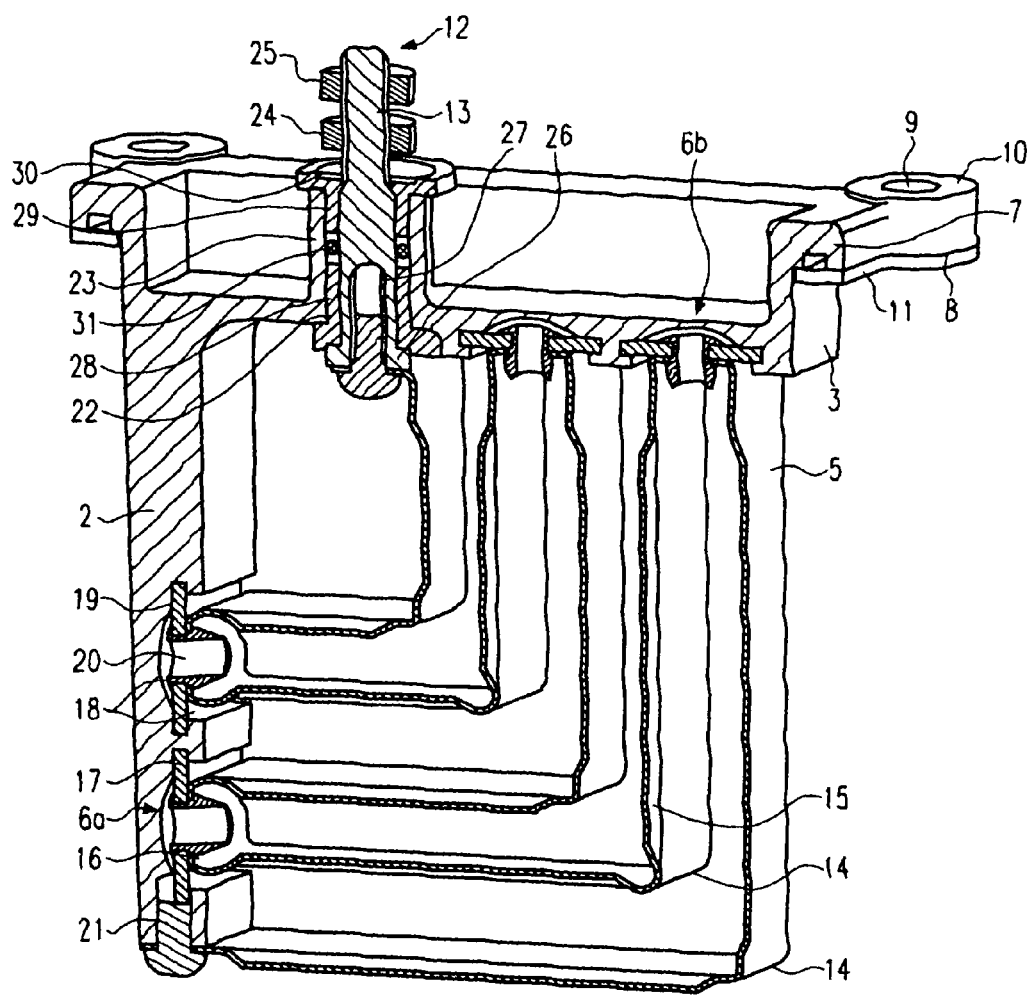
FIG. 2 a full section depiction of the heating flange of FIG. 1.

The section view in FIG. 2 shows a full section of the heating flange 1 of FIG. 1 and illustrates the attachment of the heat conductor 5 to the leg pieces 2 and 3 via insulator bodies, here insulating plates 17, and illustrates how the contact point 12 of the heating device 4 is mounted in the mounting leg piece 3. The insulator bodies can also be arranged in any other shape, for example, as a cube, cone or rod.

The mounting points 6a and 6b are formed as recesses 18 on the interior sides of the leg pieces 2 and 3, which point towards the cross-section of flow. The recesses 18 initially represent a first groove, which extends with a rectangular profile from the interior sides of the leg pieces 2 and 3 perpendicularly in the direction of the exterior side of the leg pieces. The recesses 18 are wider than they are deep. The width of the groove corresponds to at least or roughly the width of a turning point 16, so that a turning point 16 can be held in the recess 18.

A second groove, which undercuts the first groove, is formed perpendicular to the recess 18 and parallel to the longitudinal axes of the leg pieces 2 and 3, and forms guide surfaces 19 of the recess 18, said guide surfaces 19 being arranged on both sides. The guide surfaces 19 are arranged at a distance from the interior sides of the leg pieces 2 and 3. In this way, the recess 18, with the guide surfaces 19, forms an essentially T-shaped groove that has a type of insertion slot, into which the insulation plate 17 can be inserted in an insertion direction substantially traverse to the cross-section of flow. Because, in the direction of the longitudinal axes of the leg pieces 2, 3, the guide surfaces 19 extend beyond the recess 18, the insulation plate is held in a form-fit when inserted, in the direction of the longitudinal axes of the leg pieces 2 and 3 and perpendicular to the leg pieces 2 and 3.

Each turning point 16 of the heat conductor 5 is allocated to a separate insulation plate 17 and a separate mounting point 6. However, embodiments are also possible in which all turning points 16 of the heat conductor 5, which are arranged to lie together on the insertion leg piece 2 or together on the mounting leg piece 3, are mounted to a insulation plate 17 for the entire insertion leg piece 2 or the entire mounting leg piece 3.

In the embodiment of FIG. 1 and FIG. 2, the short, flat area of the turning point 16 is connected to the insulation plate 17 via a rivet 20. However, any other means of attachment, for example, a screw-nut connection, can be used instead of the rivet. The rivet 20 runs perpendicularly through the insulation plate 17 and the turning point 16 and forms a solid connection, whereby the rivet head lies on the side of the insulation plate 17.

The insulation plate 17 lies directly on a flat section between two roughly 90° kinks of the turning point 16, and in fact on the side that faces away from the areas of the heat conductor 5 that extend into the cross-section of flow. At the same time, the insulation plate 17 is wider than the turning point 16.

In FIG. 2, the insulation plate 17 rests in the guide surfaces 19 of the recess 18. The turning point 16 of the heat conductor 5 is held in the part of the recess 18 that extends from the interior side of the leg pieces 2, 3 to the insulation plates 17. The rivet head is placed in the part of the recess 18 that lies on the opposite side of the insulation plate 17.

The ends of the heat conductor 5 that runs with a meandering shape are screwed to the contact bolt 13 of the contact point 12 or the face side of the insertion leg piece 2.

The one end of the heat conductor 5 terminates flush with the face side of the insertion leg piece 2, which, on its face side, has a central threaded hole, coaxial with the longitudinal axis of the insertion leg piece 2. A mounting screw 21 with an external screw, thread extends through an opening on the one end of the heat conductor 5 and is screwed into the threaded hole against the insertion direction E of the heating flange. In this way, this end of the heat conductor 5 is attached to the face side of the insertion leg piece 2 and simultaneously connected in an electrically conductive manner. The electric circuit is closed by having the frame, with the two leg pieces 2 and 3, shunted to earth.

The other end of the heat conductor 5 is also screwed on to the contact bolt 13 in a comparable manner. The contact point 12 is positioned in a accommodation opening 22 of the mounting leg piece 3. The accommodation opening 22 of the leg piece 3 is surrounded by a circumferential, raised edge 23, which rises from the outer side of the leg piece against the insertion direction E.

The contact bolt 13 runs coaxially through the accommodation opening 22 from the heat conductor 5 to beyond the edge 23 of the accommodation opening 22.

On the end that protrudes beyond the accommodation opening 22, the contact bolt 13 has an external screw thread on which two hexagonal nuts 24 and 25 that do not touch each other are screwed. The contact bolt 13 is fixed in place in the accommodation opening 22 using the first attachment nut 24 to be screwed on. The other contact nut 25 serves first to connect the heating device 4 to a voltage supply source and second to connect the heating device 4 to a control unit. The control unit can either be integrated into the heating flange or it can be self-sufficient of the heating flange.

The end of the contact bolt 13 that protrudes into the cross-section of flow has a circumferential collar 26 and a centred threaded hole 27 that starts from the face side. At this end, the heat conductor 5 is screwed and attached to the contact bolt 13 against the insertion direction E of the heating flange.

Because the one end of the heat conductor 5 on the insertion leg piece 2 is shunted to earth, the contact bolt 13 must be electrically insulated from the accommadation opening 22 of the mounting leg piece 3. Therefore, a two-part insulating sleeve 28, 29 is introduced between contact bolt 13 and accommodation opening 22.

The insulating sleeve consists of two sleeve parts 28 and 29, each of which has a terminal, collar-shaped border strip and each of which is introduced into the accommodation opening 22 from a different side. The one insulating sleeve part 28 extends from the interior side of the accommodation opening 22 to the centre of the opening. The border strip of the sleeve part 28 is consequently held between the interior side of the mounting leg piece 3 and the collar 26 of the contact bolt 13, where it serves as an insulation plate. The other sleeve part 29 reaches from the outer edge to the centre of the retaining opening 22. The border strip of this sleeve part 29 lies on the outside edge of the retaining opening 22, where it serves as an insulation plate for the attachment nut 24. In FIG. 2, an additional washer 30 is mounted between the border strip of the outer sleeve part 29 and the attachment nut 24. The two sleeve parts 28 and 29 do not touch in the centre of the accommodation opening 22, so that a ring-shaped gap remains. A sealing ring 31 is introduced into this gap, with said sealing ring 31 providing a gas-proof seal for the retaining opening.

Figure 3:
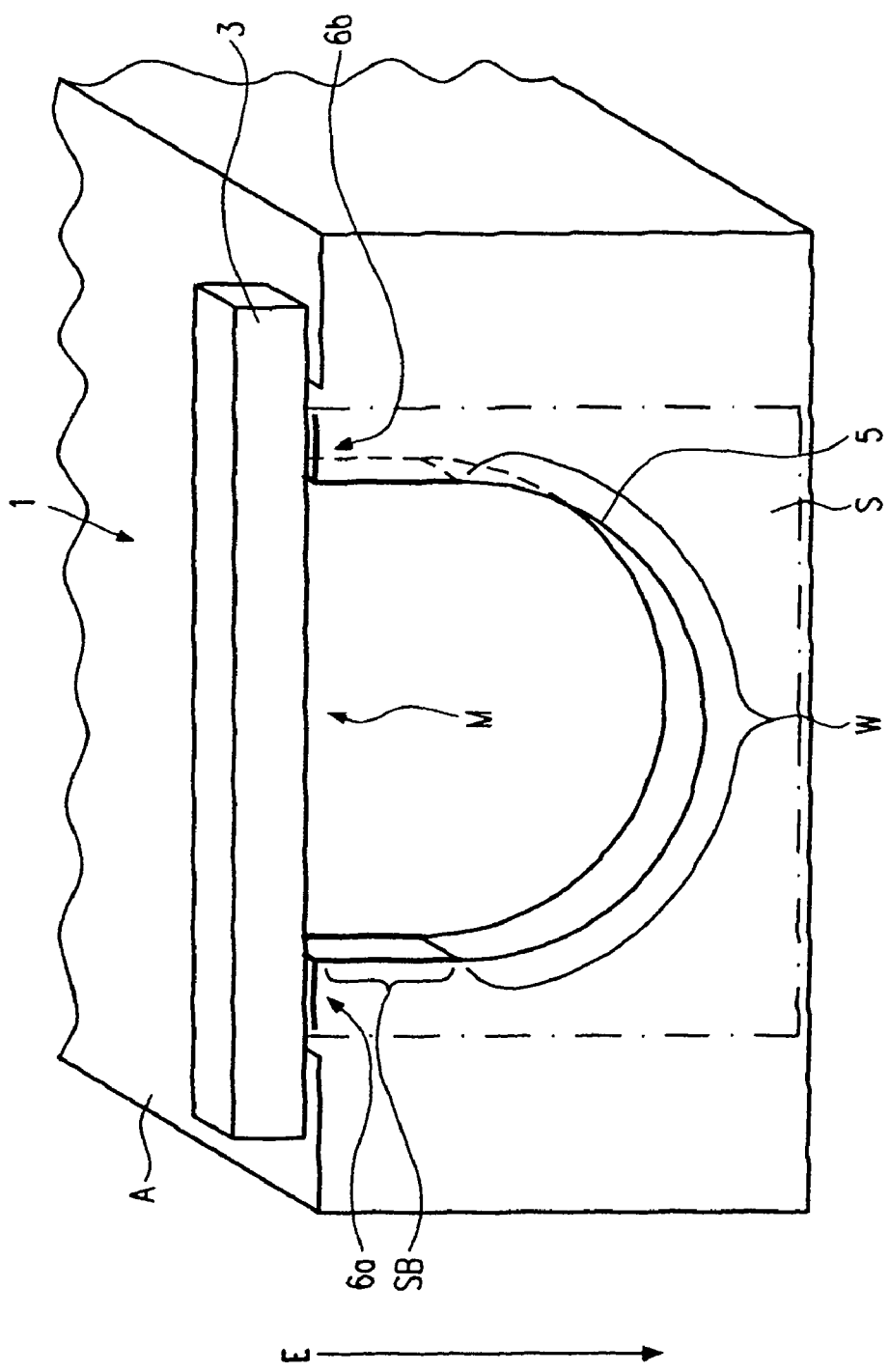
FIG. 3 a schematic perspective depiction according to a second embodiment.

FIG. 3 shows a schematic perspective depiction of a second embodiment of the heating flange according to the invention, and indicates the intake line A. For the sake of clarity, only the differences with respect to the above-described embodiment are explained in the following. For parts whose configuration and/or function is similar or identical to parts in the previous embodiment, the same reference numbers are used as in FIG. 1.

The intake line A is depicted in sectioning in the area of the heating flange 1. It can be seen that the mounting leg piece 3 lies outside the intake line A, whereas the heat conductor 5 is arranged within the intake line A. In this way, the mounting leg piece 3 covers the mounting opening M in the intake line A. No further explanation is given here for the mounting and sealing of the heating flange 1 according to the invention in the mounting opening M of the intake line A.

The heat conductor 5 of FIG. 3 is arranged with a curved shape and extends from a first mounting point 6a through the cross-section of flow S to a second mounting point 6b. The two mounting points 6a and 6b are both arranged on the mounting leg piece 3 and are located on opposite edges of the mounting opening M.

The cross-section of flow S (depicted by a dashed line) is bordered on one side by the mounting leg piece 3 or the mounting opening M. In the embodiment of FIG. 3, the cross-section of flow S corresponds to the area within the intake line A that one obtains if one projects the mounting opening M in the insertion direction E parallel to the opposite wall of the intake line A.

The heat conductor 5 is arranged in the cross-section of flow S and comprises stiffened stabilisation areas SB and a heat deformation area W, at which the linear expansion of the heat conductor 5 takes place.

The stabilisation areas SB extend essentially perpendicular to the mounting leg piece 3 from the mounting points 6a and 6b into the cross-section of flow S. The material of the ribbon-shaped heat conductor 5 has a greater thickness in the area of the stabilisation areas SB and is consequently more stable than in the heat deformation area W. Alternatively or in addition to the stabilisation of the heat conductor 5 as the result of a larger thickness, increased stiffness can also be achieved in the stabilisation zones SB by stabilisation profiles, for example, beads 15 (not shown in FIG. 3). The heat deformation area W of the heat conductor 5 is shaped as a semi-circle and connects the two ends of the stabilisation area SB that lie in the cross-section of flow, so that overall, heat conductor 5 is given an arched shape.

Figure 4:
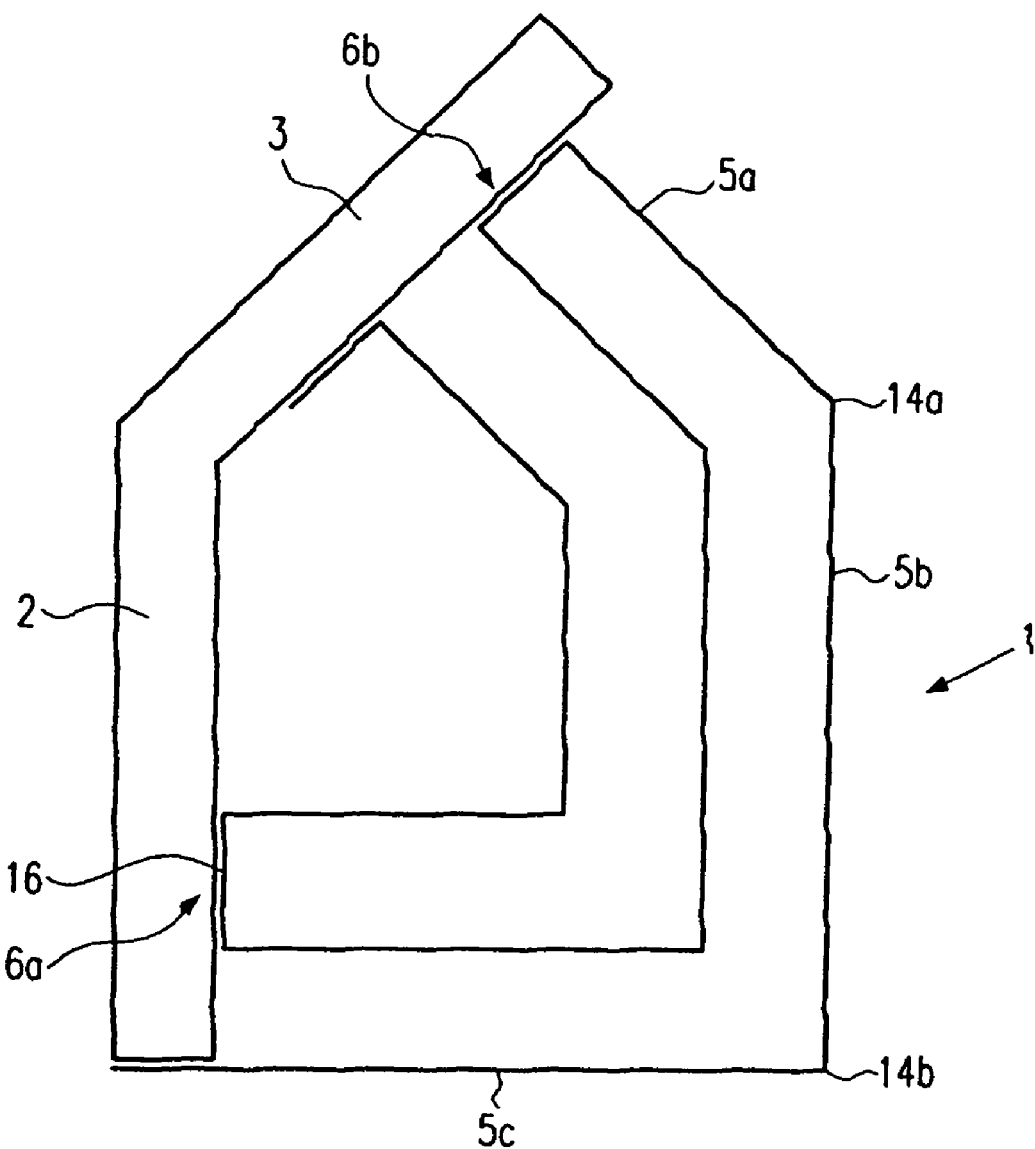
FIG. 4 a schematic side-view according to a third embodiment.

FIG. 4 shows a schematic side-view of a third embodiment of the heating flange according to the invention. For the sake of clarity, only the differences with respect to the above-described embodiments are explained in the following. For parts whose configuration and/or function is similar or identical to parts in the previous embodiment, the same reference numbers are used as in the preceding figures.

The frame of the heating flange is again provided with two leg pieces 2 and 3, which are directly connected to each other at the ends and that form an open, this time obtuse, angle in the cross-section of flow.

The heat conductor 5 is formed as a meandering strip heater, which is run back and forth between mounting points 6a and 6b of the retaining leg pieces 2 and 3. In contrast to the heat conductor 5 of FIG. 1 and FIG. 2, the heat conductor 5 in FIG. 4 has two kinks 14a and 14b in a section between the one mounting point 6a on the insertion leg piece 2 and the other mounting point 6b on the mounting leg piece 3. In this way, a heat conductor section in this embodiment has three heating leg pieces 5a, 5b and 5c. The first side piece 5a runs from the mounting point 6b on the mounting leg piece 3 to the first kink 14a. The second side piece 5b and third heating side piece 5c extend between the two kinks 14a and 14b and between the kink 14b and the mounting point 6a on the insertion leg piece 2, respectively. The sections of the heat conductor 5 or the heating leg pieces of the different sections that are run back and forth between the mounting points on the two leg pieces run parallel to one another, as in FIG. 1 and FIG. 2.

From the mounting point 6a on the leg piece 3, the heat conductor protrudes perpendicular to the retaining leg piece 3 into the through-flow surface of the heating flange. At a first kink 14a, the heat conductor 5 is turned around. Then the heat conductor 5 is run further, parallel to the surface of the second retaining leg piece 2, until it is turned around by 90° at a second kink 14b, then meeting the surface of the second leg piece 2 perpendicularly.

After a first turning point 16, the heat conductor 5 is run parallel to the first heat conductor section that protrudes into the through-flow surface, back to the first leg piece 2. Altogether, the heat conductor 5 of FIG. 4 comprises two turning points, one on each of the leg pieces 2, 3 and therefore three heat conductor sections that protrude into the through-flow surface, each with two kinks 14a and 14b and three heating leg pieces.

FIG. 4 illustrates that the kinks 14a and 14b of the areas of the conductor 5 that protrude into the intake air lie on a straight line.

The remaining development of the embodiment of FIG. 4, for example, the mounting of the heat conductor to the frame, can correspond to FIG. 1.

Figure 5:
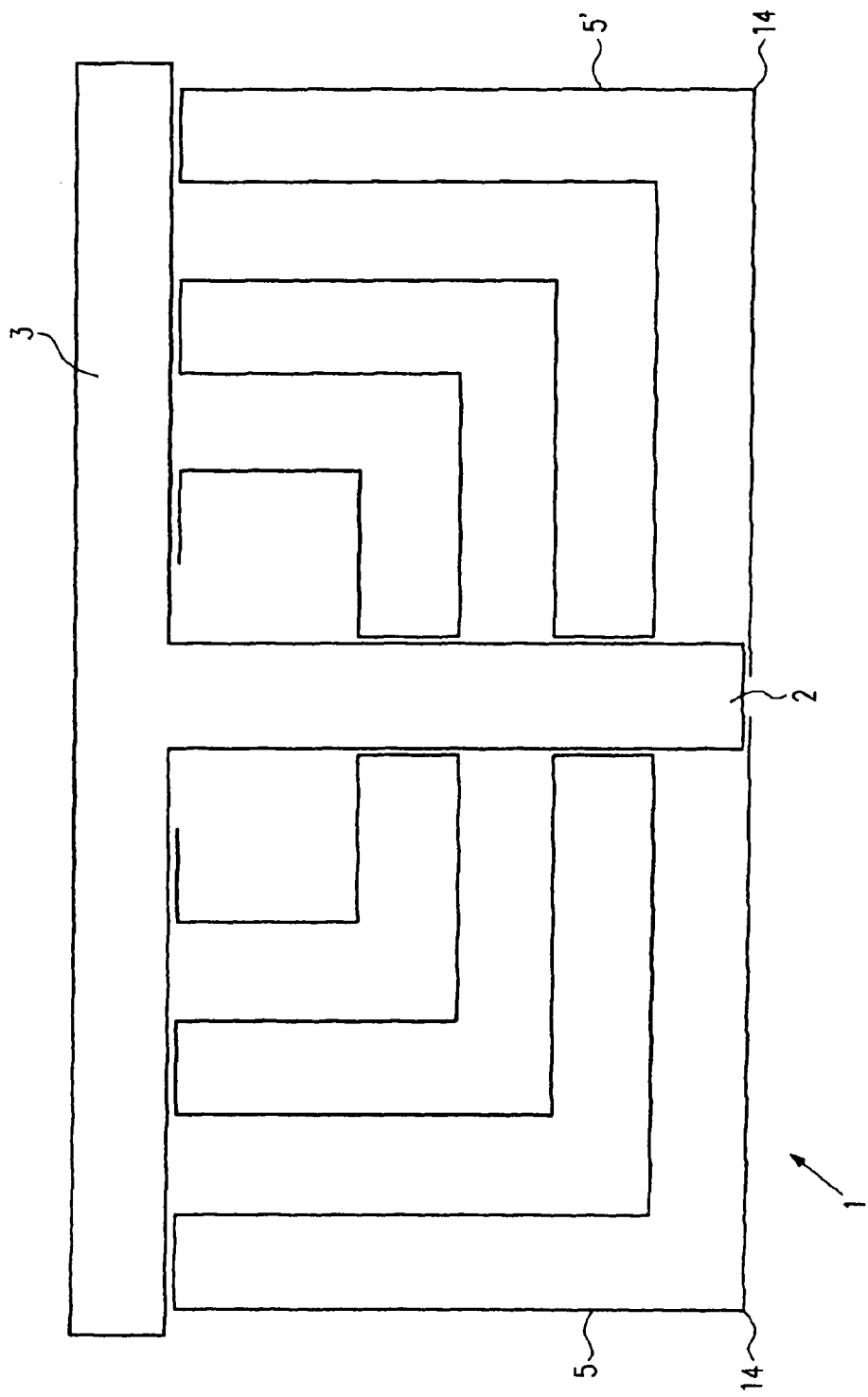
FIG. 5 a schematic side-view according to a fourth embodiment.

FIG. 5 shows the schematic side-view of a fourth embodiment. Again, only the differences with respect to the above-described embodiments are explained. For parts whose configuration and/or function is similar or identical to parts in the previous embodiments, the same reference numbers are used as in the preceding figures.

This time, the frame of the heating flange is designed with an essentially T-shaped cross-section. At the same time, the longitudinal axes of the two leg pieces 2 and 3 are arranged roughly perpendicular to one another and the one end of the insertion leg piece 2 is directly connected to roughly the centre of the mounting leg piece 3. Consequently, the two leg pieces 2 and 3 span a heating flange with two cross-sections of flow that lie next to one another.

In each of the two cross-sections of flow, a separate heat conductor 5 and 5' extends as a meandered strip heater back and forth between mounting points 6 on the leg pieces 2 and 3. The two heat conductors 5 und 5' have a kink 14 at which a turn of roughly 90° takes place in each section between a mounting point 6a on the insertion leg piece 2 and another mounting point 6b on the mounting leg piece 3.

In this embodiment, it is possible to heat the two heat conductors 5 independently of one another, so that the heat transfer from the heating flange 1 to the intake air can be very precisely controlled.

Figure 6:
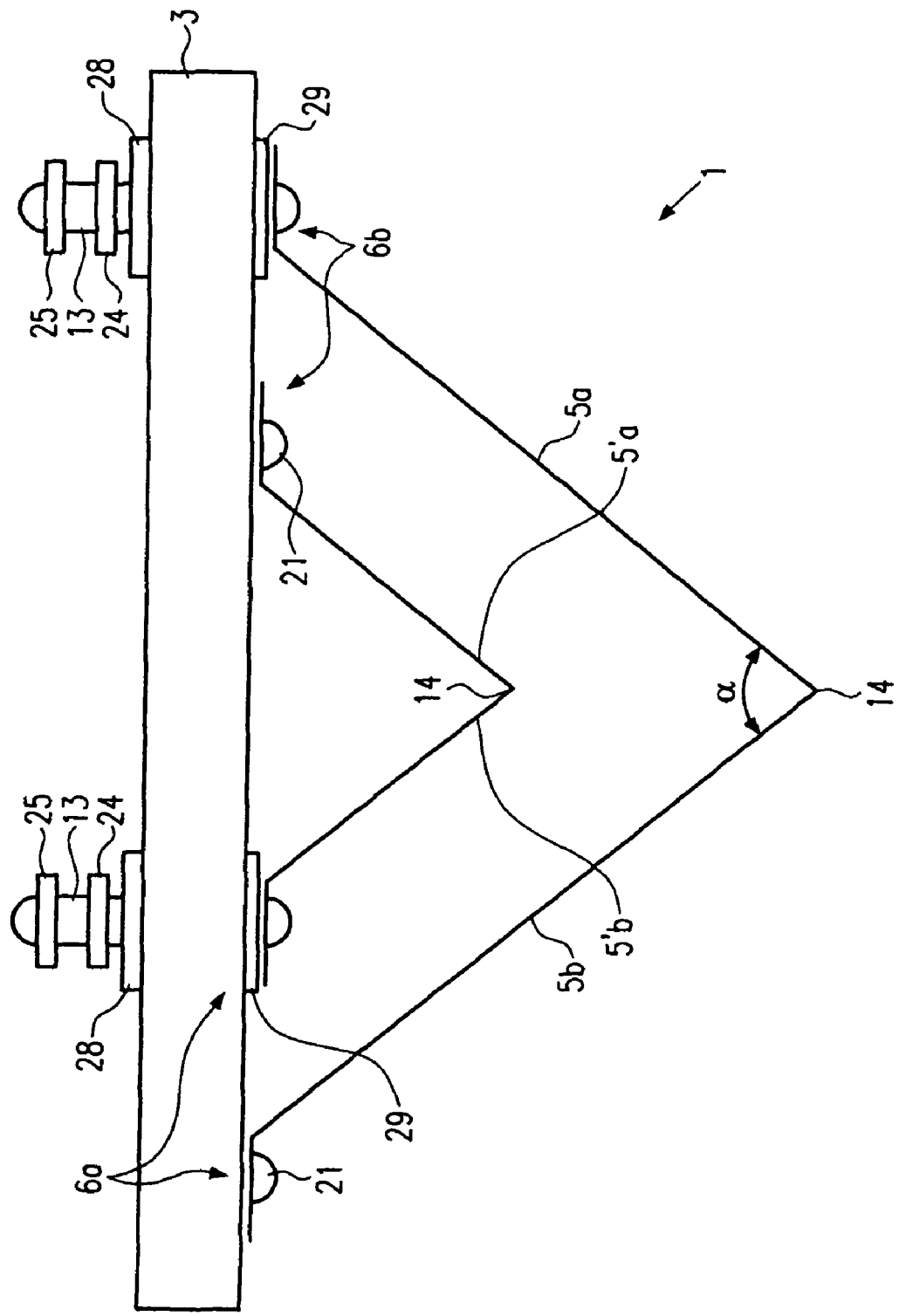
FIG. 6 a schematic side-view according to a fifth embodiment.

FIG. 6 shows a schematic side-view of a fifth embodiment of the heating flange according to the invention. Again, only the differences with respect to the above-described embodiments are explained. For parts whose configuration and/or function is similar or identical to parts in the previous embodiment, the same reference numbers are used as in the preceding figures.

Like the embodiment of FIG. 3, the heating flange of FIG. 6 has only one retaining leg piece, the mounting leg piece 3. Mounted on the mounting leg piece 3 are two independent heat conductors 5 and 5', which run in parallel and which extend through the cross-section of flow of the heating flange 1 between the mounting points 6a and 6b, wherein the mounting points 6a and 6b both lie on the one mounting leg piece 3.

Naturally, it is also possible to mount more than two heating elements 5 to mounting leg pieces 3. The advantage of an embodiment with more than one independent heat conductor 5 is that switchable control is possible for better adjustment of the heating capacity. The embodiment of FIG. 6 can alternatively be formed with a single heating meander with turning points, as in the preceding embodiments.

Each of the two heat conductors 5 and 5' has two straight heating leg pieces 5a', 5b' or 5a, 5b, which form the angle α at a kink 14 by means of which two heating leg pieces that are roughly at right angles to one another are formed for each heat conductor. In the case of the embodiment of FIG. 6, the longitudinal axis of the mounting leg piece 3 and the two heating side pieces 5a, 5b or 5a', 5b' of the heat conductors 5 and 5' between the mounting points 6a and 6b generate a stable triangular structure according to the invention, wherein the heat conductor 5' spans a smaller triangular surface because it has shorter heating leg pieces than the other heat conductor 5. The triangles spanned in this way are essentially right-angled triangles, each of whose right angles lies at the kink 14.

Again, the kinks of the heat conductors 5 and 5' lie on a line, which, in this case, is roughly the perpendicular bisector of the mounting leg piece 3. The attachment of the two heat conductors 5 and 5' in the embodiment of FIG. 5 is accomplished in a manner similar to that for the ends of the meander strip heater of FIG. 1 and FIG. 2.

Figure 7:
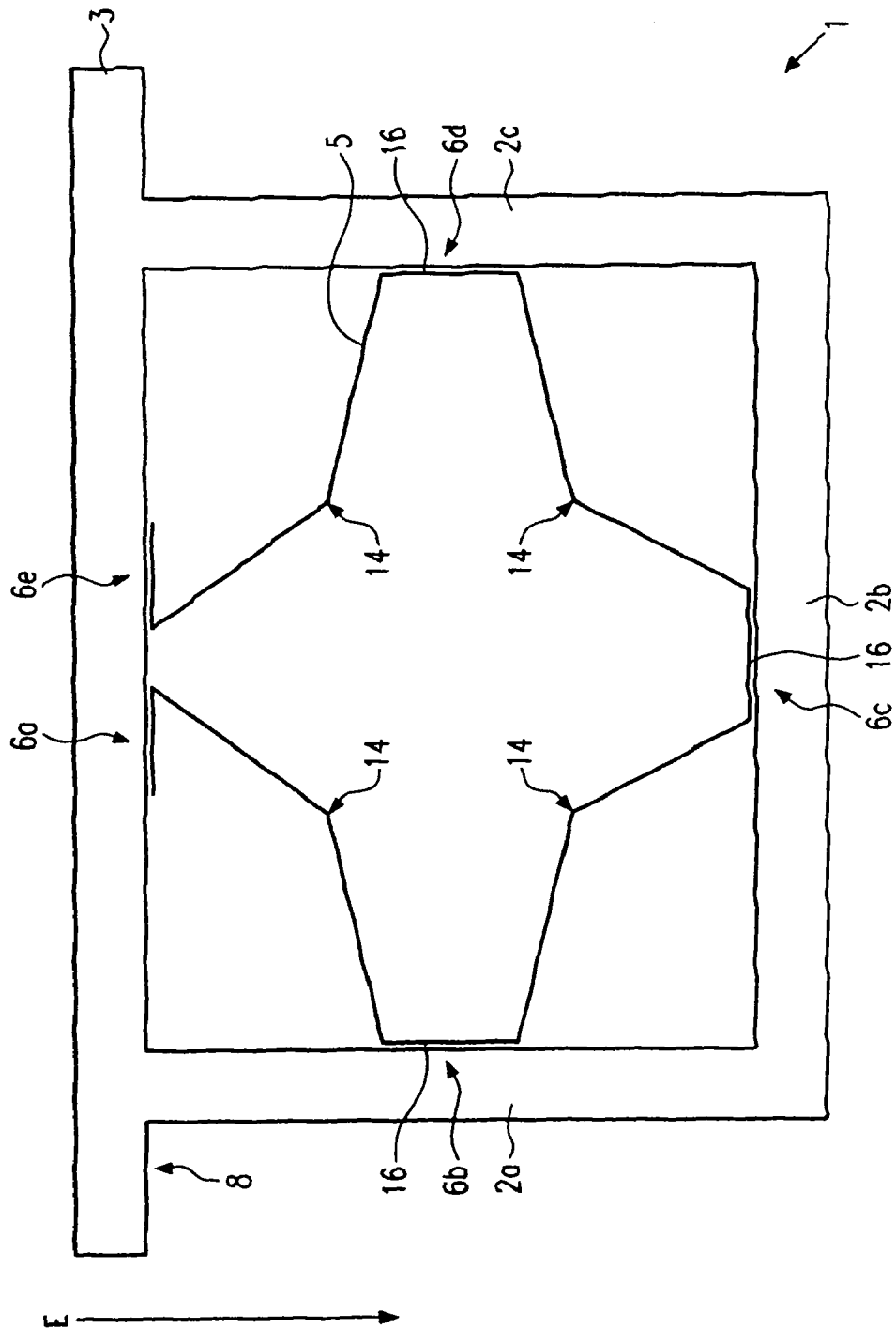
FIG. 7 a schematic side-view according to a sixth embodiment.

FIG. 7 shows a schematic side-view of a sixth embodiment with a closed frame. Again, for the sake of clarity, only the differences with respect to the above-described embodiments are explained. For parts whose configuration and/or function is similar or identical to parts in the previous embodiments, the same reference numbers are used as in the preceding figures.

The essentially rectangular frame of the heating flange of FIG. 7 has a cross-section of flow that is bordered by four retaining leg pieces 2a, 2b, 2c and 3. The retaining leg piece 3 that is formed as a mounting leg piece extends beyond the connection points with the retaining leg pieces 2a and 2c that run in the insertion direction. In this way, the mounting leg piece 3 is given a supporting shoulder 8, as already described in FIG. 1. The closed frame form is, however, not limited to a rectangular embodiment with four leg pieces, but can instead be produced in the form of any polygon and can even be interrupted in sections.

In the cross-section of flow, a heat conductor 5 is attached to all four retaining leg pieces 2a, 2b, 2c and 3. The one end of the heat conductor is attached to the mounting leg piece 3. From there, it extends through the cross-section of flow to a next mounting point on the insertion leg piece 2a, which runs perpendicularly to the mounting leg piece 3. In this way, the heating flange of FIG. 7 is given a first triangular structure, which is formed by the longitudinal axes of the retaining leg pieces 3 and 2a and the straight line through the mounting points 6a and 6b.

In the heat conductor section between the first mounting point 6a on the mounting leg piece 3 and the second mounting point 6b on the insertion leg piece 2a, the heat conductor 5 has a kink 14, by means of which this first heat conductor section is divided into two heating leg pieces, which is similar to the heat conductor of the embodiment of FIG. 1. Unlike in FIG. 1, however, the two heating leg pieces form an obtuse angle in FIG. 7. The invention is not to be limited to a development with kinked heat conductor sections, however, but instead it is possible to use any heat conductors that guarantee controlled length compensation based on the shape of the heat conductor. This also includes curved heat conductor sections or sections with a smaller cross-section but without a kink, among other possibilities.

The heat conductor 5 then again extends from the second mounting point 6b on the insertion leg piece 2a through the cross-section of flow to a third mounting point 6c on the third retaining leg piece 2b, which is arranged parallel to the mounting leg piece 3 and perpendicular to the insertion leg piece 2a. In turn, the second heat conductor section has an obtuse angled kink 14 and consequently two additional heating leg pieces between the second mounting point 6b and the third mounting point 6c.

In a corresponding way, the heat conductor 5 runs in a further section with a kink 14 from the third mounting point 6c to a fourth mounting point 6d on the fourth retaining leg piece, which in turn runs parallel to the insertion directions and finally ends at a fifth mounting point 6e, which, like the other end of the heat conductor 5, is arranged on the mounting leg piece 3.

Consequently, the heat conductor 5 of the embodiment of FIG. 7 has four heat conductor sections, each of which is formed with one kink 14 and two heating leg pieces. Altogether, four triangular structures result, with said triangular structures being formed by the longitudinal axes of abutting retaining leg pieces and the straight line through the successive mounting points of a heat conductor section.

In the case of the embodiment of FIG. 7, the circumferential heat conductor 5 can also be divided into several independent heating circuits, by, for example, shunting the turning point 16 of the mounting point 6c on the frame (2a, 2b, 2c, 3) to earth and insulating the mounting points 6a to 6e from the mounting leg piece 3 and providing them with separate contact points. In this way, it is possible to heat either only the section from the first mounting point 6a or the fifth mounting point 6e to the third mounting point 6c or both sections.

Figure 8:
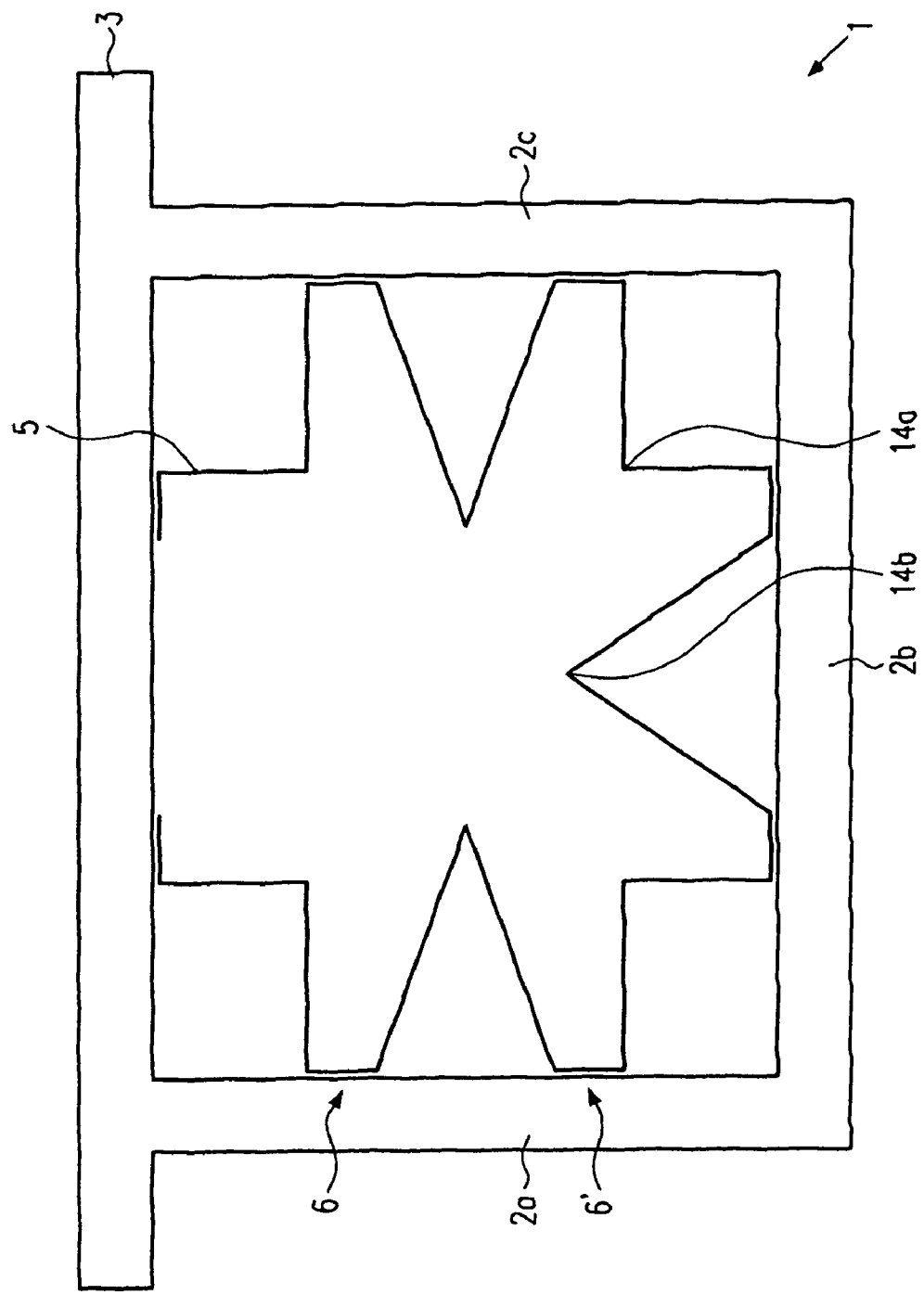
FIG. 8 a schematic side-view according to a seventh embodiment.

FIG. 8 shows a further schematic side-view according to a last embodiment. Again, only the differences with respect to the above-described embodiments are explained, whereby, for the sake of clarity, the same reference numbers are used as in the preceding figures for parts whose configuration and/or function is similar or identical to that of parts in the previous embodiment.

The embodiment of FIG. 8 is a modification of the embodiment of FIG. 7. In both figures, the heating flange has a closed frame with four retaining leg pieces 2a, 2b, 2c and 3, as well as a circumferential heat conductor 5 in the cross-section of flow, where said heat conductor 5, starting from a mounting leg piece 3, is successively attached to the other leg pieces 2a, 2b and 2c before ending again at the mounting leg piece 3. Unlike FIG. 6, in the case of the embodiment of FIG. 8 there is a direction change of roughly 90° at the kinks in the heat conductor sections that lie between two retaining leg pieces. Furthermore, the heating flange of FIG. 8 has not only one but two mounting points on each of the retaining leg pieces 2a, 2b and 2c, so that the heat conductor 5 is not run to another retaining side piece with each heat conductor section.

According to this embodiment, the heat conductor 5 has three additional heat conductor sections, which extend into the cross-section of flow between the two mounting points on the retaining leg pieces 2a, 2b and 2c.

These three additional heat conductor sections run in a manner analogous to the embodiment of FIG. 6, in which one heat conductor section with two heating leg pieces and one kink runs between two mounting points, both of which lie on the same retaining leg piece.

The above embodiments represent only exemplary developments, whose features can be combined and modified as desired. For example, the heat conductors 5 of FIG. 3 to FIG. 8 can also be introduced into recess 18 of the retaining leg pieces 2 and 3 via mounting plates 17. Furthermore, for example, it is also not necessary to produce the heat conductor 5 of FIG. 1 and FIG. 2 as a meander strip heater, but instead, several heat conductors 5 that can be operated mutually independently, as shown in FIG. 6, or, conversely, the two independent heat conductors 5 and 5' of FIG. 6 can be joined into one heating meander.

What is claimed is:

1. Heating flange for heating a flow of gas as it flows through a cross-section of flow, wherein the heating flange is formed such that it can be inserted or interposed in an intake line of an internal combustion engine and has at least one heat conductor, which extends through the cross-section of flow from a mounting point to an immediately following further mounting point on the heating flange, as well as a retaining leg piece that is provided with at least one of the mounting points, characterized in that the longitudinal axis of the one retaining leg piece forms a triangle, on the one hand, with two heating side pieces of the heat conductor between the one mounting point and the further mounting point that is also arranged on the one retaining side piece, or, on the other hand, with the longitudinal axis of a further retaining leg piece on which the further mounting point is provided, as well as with the straight line through the one and the further mounting point.

2. Heating flange according to claim 1, characterized in that at least one additional heat conductor extends through the cross-section of flow.

3. Heating flange according to claim 1, characterized in that the heat conductor is formed as a heating meander with multiple heat conductor sections arranged between mounting points and repeatedly extends through the cross section of flow in a meandering form.

4. Heating flange according to claim 1, characterized in that the at least one conductor has at least two straight leg pieces which form at least one angle $\alpha$.

5. Heating flange according to claim 4, characterized in that the angle $\alpha$ is substantially a right angle.

6. Heating flange according to claim 1, characterized in that the at least one heat conductor is formed as an electric, essentially ribbon-shaped heat conductor.

7. Heating flange according to claim 1, characterized in that the heat conductor sections of a heat conductor and/or of various heat conductors are arranged so that they are essentially parallel in the cross-section of flow.

8. Heating flange according to claim 1, characterized in that the heat conductor sections of a heat conductor and/or various heat conductors are of various lengths and arranged so that they are nested in one another in the cross-section of flow.

9. Heating flange according to claim 1, characterized in that the heat conductor has a heat-deformation section in the cross-section of flow that extends essentially freely between the mounting points with said heat-deformation section having, when the heat conductor is heated, a ductility greater than the ductility of its surroundings.

10. Heating flange according to claim 9, characterized in that the heat-deformation section has a smaller cross-section than does its surroundings.

11. Heating flange according to claim 9, characterized in that the longitudinal axis of the heat conductor has a change of direction in the heat-deformation section.

12. Heating flange according to claim 11, characterized in that the at least one heat conductor between the mounting paints is angled at least one time at a kink.

13. Heating flange according to claim 12, characterized in that the kinks of the heat conductor sections of a heat conductor and/or various heat conductors that run through the cross-section of flow essentially lie on a line.

14. Heating flange according to claim 1, characterized in that the heat conductor has stabilization areas, which, at least to some extent, are given stiffening profiles by means of which the flexural rigidity is increased along the lengthwise direction of the heat conductor.

15. Heating flange according to claim 14, characterized in that a heat conductor that is essentially ribbon-shaped has at least one bead that extends lengthwise along the heat conductor.

16. Heating flange according to claim 1, characterized in that the heat conductor is essentially rigidly connected to the respective retaining leg piece at the mounting points.

17. Heating flange according to claim 1, characterized in that there is an insulator body provided at each mounting point of a retaining leg piece between the heat conductor and the respective retaining leg piece, with said insulator body serving as a mounting body by means of which the heat conductor is attached on the respective retaining leg piece.

18. Heating flange according to claim 17, characterized in that the insulator body is connected to the heat conductor via a fixing means.

19. Heating flange according to claim 17, characterized in that the heat conductor and the insulator bodies connected to the heat conductor are designed as a one-piece, manageable unit.

20. Heating flange according to claim 19, characterized in that the one-piece manageable unit is repeatedly detachable from the mounting points of the retaining leg pieces.

21. Heating flange according to claim 17, characterized in that a recess is formed at the mounting point in such a way that the insulator body is held in the recess.

22. Heating flange according to claim 21, characterized in that, in the recess of the mounting point, the insulator body is held non-positively in an insertion direction, which runs essentially perpendicular to the cross-section of the flow, and having a positive fit in the two axes in space that are perpendicular to the insertion direction.

23. Heating flange according to claim 17, characterized in that the insulator body is formed as an insulation plate.

24. Heating flange according to claim 1, characterized in that two retaining leg pieces form an open frame in the shape of an angle.

25. Heating flange according to claim 24, characterized in that the longitudinal axes of the retaining side pieces are arranged essentially perpendicular to one another.

26. Heating flange according to claim 25, characterized in that the retaining leg pieces form an essentially L-shaped frame in cross-section in a plane parallel to the cross-section of the flow.

27. Heating flange according to claim 24, characterized in that at least three retaining leg pieces of the heating flange form an essentially closed frame.

28. Heating flange according to claim 24, characterized in that a retaining leg piece of the frame is formed in one-piece with a mounting flange.

29. Heating flange according to claim 28, characterized in that a sealing means is arranged between the mounting flange and the intake line when the heating flange is in the mounted state.

30. Heating flange according to claim 24, characterized in that the frame is produced as a cast part.

31. Heating flange for heating a flow of gas as it flows through a cross-section of flow, wherein the heating flange is formed such that it can be inserted or interposed in an intake line of an internal combustion engine and has at least one heat conductor, which extends through the cross-section of flow from a mounting point to an immediately following further mounting point on the heating flange, as well as a retaining leg piece, which is provided with at least one of the mounting points, characterized in that the heat conductor extends in a curved form from the one mounting point arranged on the edge of the cross-section of flow essentially freely through the cross-section of flow to the further mounting point, likewise arranged on the edge of the cross-section of flow and on the one retaining piece.

32. Heating flange according to claim 31, characterized in that at least one additional heat conductor extends through the cross-section of flow.

33. Heating flange according to claim 31, characterized in that the heat conductor is formed as a heating meander with multiple heat conductor sections arranged between mounting points and repeatedly extends through the cross section of flow in a meandering form.

34. Heating flange according to claim 31, characterized in that the at least one conductor has at least two straight leg pieces which form at least one angle $\alpha$.

35. Heating flange according to claim 34, characterized in that the angle $\alpha$ is substantially a right angle.

36. Heating flange according to claim 31, characterized in that the at least one heat conductor is formed as an electric, essentially ribbon-shaped heat conductor.

37. Heating flange according to claim 31, characterized in that the heat conductor sections of a heat conductor and/or of various heat conductors are arranged so that they are essentially parallel in the cross-section of flow.

38. Heating flange according to claim 31, characterized in that the heat conductor sections of a heat conductor and/or various heat conductors are of various lengths and arranged so that they are nested in one another in the cross-section of flow.

39. Heating flange according to claim 31, characterized in that the heat conductor has a heat-deformation section in the cross-section of flow that extends essentially freely between the mounting points with said heat-deformation section having, when the heat conductor is heated, a ductility greater than the ductility of its surroundings.

40. Heating flange according to claim 39, characterized in that the heat-deformation section has a smaller cross-section than does its surroundings.

41. Heating flange according to claim 39, characterized in that the longitudinal axis of the heat conductor has a change of direction in the heat-deformation section.

42. Heating flange according to claim 41, characterized in that the at least one heat conductor between the mounting points is angled at least one time at a kink.

43. Heating flange according to claim 42, characterized in that the kinks of the heat conductor sections of a heat conductor and/or various heat conductors that run through the cross-section of flow essentially lie on a line.

44. Heating flange according to claim 31, characterized in that the heat conductor has stabilization areas, which, at least to some extent, are given stiffening profiles by means of which the flexural rigidity is increased along the lengthwise direction of the heat conductor.

45. Heating flange according to claim 44, characterized in that a heat conductor that is essentially ribbon-shaped has at least one bead that extends lengthwise along the heat conductor.

46. Heating flange according to claim 31, characterized in that the heat conductor is essentially rigidly connected to the respective retaining leg piece at the mounting points.

47. Heating flange according to claim 31, characterized in that there is an insulator body provided at each mounting point of a retaining leg piece between the heat conductor and the respective retaining leg piece, with said insulator body serving as a mounting body by means of which the heat conductor is attached on the respective retaining leg piece.

48. Heating flange according to claim 47, characterized in that the insulator body is connected to the heat conductor via a fixing means.

49. Heating flange according to claim 47, characterized in that the heat conductor and the insulator bodies connected to the heat conductor are designed as a one-piece, manageable unit.

50. Heating flange according to claim 49, characterized in that the one-piece manageable unit is repeatedly detachable from the mounting points of the retaining leg pieces.

51. Heating flange according to claim 47, characterized in that a recess is formed at the mounting point in such a way that the insulator body is held in the recess.

52. Heating flange according to claim 51, characterized in that, in the recess of the mounting point, the insulator body is held non-positively in an insertion direction, which runs essentially perpendicular to the cross-section of the flow, and having a positive fit in the two axes in space that are perpendicular to the insertion direction.

53. Heating flange according to claim 47, characterized in that the insulator body is formed as an insulation plate.

54. Heating flange according to claim 31, characterized in that two retaining leg pieces form an open frame in the shape of an angle.

55. Heating flange according to claim 54, characterized in that the longitudinal axes of the retaining side pieces are arranged essentially perpendicular to one another.

56. Heating flange according to claim 55, characterized in that the retaining leg pieces form an essentially L-shaped frame in cross-section in a plane parallel to the cross-section of the flow.

57. Heating flange according to claim 54, characterized in that at least three retaining leg pieces of the heating flange form an essentially closed frame.

58. Heating flange according to claim 54, characterized in that a retaining leg piece of the frame is formed in one-piece with a mounting flange.

59. Heating flange according to claim 58, characterized in that a sealing means is arranged between the mounting flange and the intake line when the heating flange is in the mounted state.

60. Heating flange according to claim 54, characterized in that the frame is produced as a cast part.

* * * * *